(12) United States Patent
Silet et al.

(10) Patent No.: US 11,879,347 B2
(45) Date of Patent: Jan. 23, 2024

(54) TURBINE HOUSING COOLING DEVICE

(71) Applicant: SAFRAN AIRCRAFT ENGINES, Paris (FR)

(72) Inventors: Benoit Guillaume Silet, Moissy-Cramayel (FR); Stéphane Pierre Guillaume Blanchard, Moissy-Cramayel (FR); Fabien Stéphane Garnier, Moissy-Cramayel (FR); Thibaud Louis Zaia, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/919,184

(22) PCT Filed: Apr. 13, 2021

(86) PCT No.: PCT/FR2021/050650
§ 371 (c)(1),
(2) Date: Oct. 14, 2022

(87) PCT Pub. No.: WO2021/209713
PCT Pub. Date: Oct. 21, 2021

(65) Prior Publication Data
US 2023/0160319 A1 May 25, 2023

(30) Foreign Application Priority Data

Apr. 17, 2020 (FR) ...................................... 2003894

(51) Int. Cl.
*F01D 25/14* (2006.01)
*F01D 25/12* (2006.01)

(52) U.S. Cl.
CPC ............. *F01D 25/14* (2013.01); *F01D 25/12* (2013.01); *F05D 2260/60* (2013.01)

(58) Field of Classification Search
CPC .......... F01D 25/14; F01D 25/12; F01D 25/08; F01D 11/24
See application file for complete search history.

(56) References Cited

U.S. PATENT DOCUMENTS

| 5,205,115 A | * | 4/1993 | Plemmons | ............... F01D 11/24 |
|  |  |  |  | 415/173.1 |
| 6,035,929 A | * | 3/2000 | Friedel | ..................... F28F 3/12 |
|  |  |  |  | 415/176 |

(Continued)

FOREIGN PATENT DOCUMENTS

| EP | 0 892 153 A1 | 1/1999 |
| EP | 1 205 637 A1 | 5/2002 |

(Continued)

OTHER PUBLICATIONS

French Preliminary Search Report for FR 2003894 dated Nov. 25, 2020.

(Continued)

*Primary Examiner* — Eldon T Brockman
(74) *Attorney, Agent, or Firm* — Sughrue Mion, PLLC

(57) ABSTRACT

A turbomachine turbine casing that extend around an axis and includes an annular wall and a cooling device. The annular wall is provided with a casing hook which extends in radial protrusion from an inside of the annular wall. The casing hook allows a mounting, on the turbomachine turbine casing, of ring segments disposed circumferentially end to end around the axis. The cooling device includes a collector duct intended to convey cooling air, the collector duct extending circumferentially around the annular wall. The collector duct has a cooling air inlet and a cooling air outlet. The collector duct and the annular wall have a common portion, which delimits the collector duct and from which the corresponding casing hook extends.

12 Claims, 7 Drawing Sheets

(56) References Cited

U.S. PATENT DOCUMENTS

| | | | | |
|---|---|---|---|---|
| 6,666,645 B1 * | 12/2003 | Arilla | ................... | F01D 25/246 |
| | | | | 415/173.1 |
| 6,726,446 B2 * | 4/2004 | Arilla | ................... | F01D 25/246 |
| | | | | 415/173.1 |
| 6,896,038 B2 * | 5/2005 | Arilla | .................... | F01D 25/12 |
| | | | | 165/47 |
| 2002/0053837 A1 * | 5/2002 | Arilla | .................... | F01D 11/24 |
| | | | | 310/58 |
| 2014/0030066 A1 | 1/2014 | Schimmels et al. | | |

FOREIGN PATENT DOCUMENTS

| | | |
|---|---|---|
| EP | 1 847 687 A1 | 3/2007 |
| FR | 3 021 700 A1 | 5/2014 |
| GB | 2 103 718 A | 2/1983 |

OTHER PUBLICATIONS

International Search Report for PCT/FR2021/050650 dated Aug. 3, 2021.

* cited by examiner

TURBINE HOUSING COOLING DEVICE

This application is a National Stage of International Application No. PCT/FR2021/050650 filed Apr. 13, 2021, claiming priority based on French Patent Application No. 2003894 filed Apr. 17, 2020, the contents of each of which being herein incorporated by reference in their entireties.

FIELD OF THE INVENTION

This invention relates to a turbine casing of a turbomachine, in particular of a turbojet engine or of an airplane turbo-propeller engine.

PRIOR ART

The casing of a low-pressure turbine is a master part for carrying the low-pressure turbine and guaranteeing the correct transmission of the expansion energy to the low-pressure turbine, to the low-pressure compressor and to the fan. This casing mainly supports the ring segments which surround each wheel and the nozzle guide vane using casing hooks. These hooks are subjected to high temperatures and steep thermal gradients. Specifically, outside the casing, the air has a temperature level in the order of a few hundred degrees, while the flow path air, which can reach over 1000° C., circulates inside the casing. It is therefore advantageous to cool the casing hooks.

In addition, to guarantee high efficiency of the turbomachine, it is advisable to limit the air flow not passing through the wheels of the different stages, i.e. to limit the leaks between the radially outer ends of the blades and the abradable material ring. To do this, it is advisable to control the clearance at the level of this interface, this clearance being dependent on the temperature of the casing, and particularly of the areas of said casing including the hooks or flanges supporting the ring.

In order to control the aforementioned clearance and avoid any premature degradation of the different fixed and movable parts of the turbine, it is thus necessary to make provision for effective cooling means which can easily be incorporated into the environment of the turbomachine.

The attached FIG. 1 shows a cooling device of a casing according to the patent application FR3021700, in the name of the Applicant. This figure shows a cooling device 21 of a casing 18 of a low-pressure turbine 7, this turbine 7 being itself visible only in FIGS. 3 and 4. This cooling device includes collector boxes 22, each collector box 22 forming a channel extending axially. The device 21 also includes tubes 23 extending circumferentially on either side of the collector boxes 22. Said tubes 23, also known as manifolds, are formed by curved lines of circular section, each tube 23 extending circumferentially around the casing, for example around an angle of approximately 90 degrees. Each tube 23 includes an air inlet opening into the channel of the corresponding collector box 22 and a closed distal end. Each tube 23 further includes a cylindrical wall provided with air exhaust holes turned toward the casing 18, such that the cooling air can enter into the collector boxes 22 then in the tubes 23, before opening via the exhaust holes facing the casing 18, in such a way as to cool it. This is in particular known as impingement cooling since air impinges on the casing 18.

Furthermore, although this is not visible in FIG. 1, the casing 18 comprises on its radially innerface, at least one annular hook which makes it possible to attach fixed vanes or sealing ring segments. The aforementioned airjet impingement cooling technique does not however make it possible to cool correctly these hooks. It would therefore be desirable to improve the cooling of the casing skin in such a way as to improve the cooling of the hooks over their whole length and thus improve the thermal resistance at the hook tip.

Also known is the document EP1847687, which makes provision for a device for cooling a turbine casing of a turbomachine. The attached FIGS. 2, 2a and 2b show such a cooling device. The latter uses a part of the air intended for the cooling of the nozzle guide vane upstream of the turbine to cool the hooks 70, 72 and a lock 74 allowing the attachment of the ring segments 34. Thus, in this document, a supply chamber 48 supplies air to the inner cavities 46 of the vanes of the nozzle guide vane using cylindrical tubes 54. Openings 80, 82, 90 are made in such a way as to connect the inner cavities 46 of the vanes to the annular housing space 76 in which the attaching hooks 70, 72 are located. More precisely, openings are made either in the plates 64 enclosing the inner cavity of each vane and in the downstream outer rim 42 of the outer wall 38 of the nozzle guide vane as shown in FIGS. 2 and 2a, or in the outer annular rim 42 of the nozzle guide vane and in the annular tab 44 of this outer rim 42 of the nozzle guide vane, as is shown in FIG. 2b.

However, in both cases, the air used to cool the hooks is relatively warm due to the convective exchanges with the radially outer platform 38 of the nozzle guide vane.

Furthermore, the ducts that bring the cooling air from the inside of the vanes to the hooks are relatively long, which means that the air undergoes additional heat exchanges in these ducts.

Finally, from the documents EP 0 892 153, GB 2 103 718, EP 1 205 637 and US 2014/030066 devices are known for cooling a casing equipped on its radially inner face with ring segment attaching hooks. However, all these devices comprise a collector duct intended to convey the cooling air, which is separate from the casing bearing the hooks. The cooling is done via air exhaust holes, drilled through the collector duct and oriented in the direction of said casing. Such impingement cooling is not enough to effectively cool the hooks.

There is therefore a need to improve the cooling techniques of the prior art.

SUMMARY OF THE INVENTION

One aim of the invention is to make provision for better cooling of the turbomachine casing hooks than the solutions of the prior art described above.

Provision is hence made according to a first aspect of the invention, for a turbomachine turbine casing, said casing extending around an axis, comprising an annular wall and a cooling device, the wall being provided with at least one casing hook which extends in radial protrusion from the inside of the wall, each hook being configured to allow the mounting, on the casing, of ring segments disposed circumferentially end to end around the axis, and wherein the cooling device comprises at least one collector duct intended to convey the cooling air which extends circumferentially around the wall, each collector duct having a cooling air inlet and outlet.

In accordance with the invention each collector duct and the wall have a common portion which delimits said collector duct and from which a corresponding hook extends.

In other words, the wall from which the hook extends constitutes a portion of the wall of the collector duct intended for conveying the cooling air.

This configuration makes it possible to cool a greater part of the outer surface of said casing than that which can be cooled with the devices of the prior art, and thus to increase the lifetime of the casing.

Advantageously, the turbine casing also comprises one or more of the following features:
- the cooling device comprises two axially adjacent collector ducts separated by a separating wall.
- each collector duct is in fluid communication with a ventilation circuit which extends in the corresponding hook.
- each ventilation circuit extends in the greater axial part of the axial extent of the corresponding hook.
- each ventilation circuit extends circumferentially in the corresponding hook.
- the inlet of each collector duct is connected to a supply tube for conveying air into the collector duct.
- each ventilation circuit opens mainly radially into the corresponding collector duct via an inlet channel.
- each ventilation circuit opens onto an outer surface of the cooling device via an outlet channel.
- the inlet channel and/or the outlet channel extends plumb with the corresponding hook.
- the inlet channel and the outlet channel extend at a first and second circumferential position of the corresponding hook, the first and second circumferential position of said corresponding hook being intended to coincide with the circumferentially opposite ends of a ring segment intended to be suspended on the corresponding hook.

The proposed cooling device allows a better cooling of the casing hook over its entire length, an increase in the lifetime of the hook by limiting thermal gradients over the length of the hook, and by limiting tangential thermal gradients.

In addition, the circulation of air over sectors which extend circumferentially makes it possible to cool the hook ends better and to reduce angular thermal distortion.

Furthermore, the casing collector system makes it possible to homogenize the inlet cooling temperature of the casing.

In addition, by comparison with the prior art, the proposed cooling device makes it possible to draw off a lower bleed flow rate to provide the same function of thermal protection of the casing.

Also, the proposed cooling device can be easily incorporated into models of engine composed of a casing with hooks.

According to a second aspect, the invention makes provision for a turbomachine including a turbine, and a turbine casing according to one of the preceding features.

DESCRIPTION OF THE FIGURES

Other features, aims and advantages of the invention will become apparent from the following description, which is purely illustrative and non-limiting, and which must be read facing the appended drawings wherein.

DETAILED DESCRIPTION OF THE INVENTION

Figure 1:
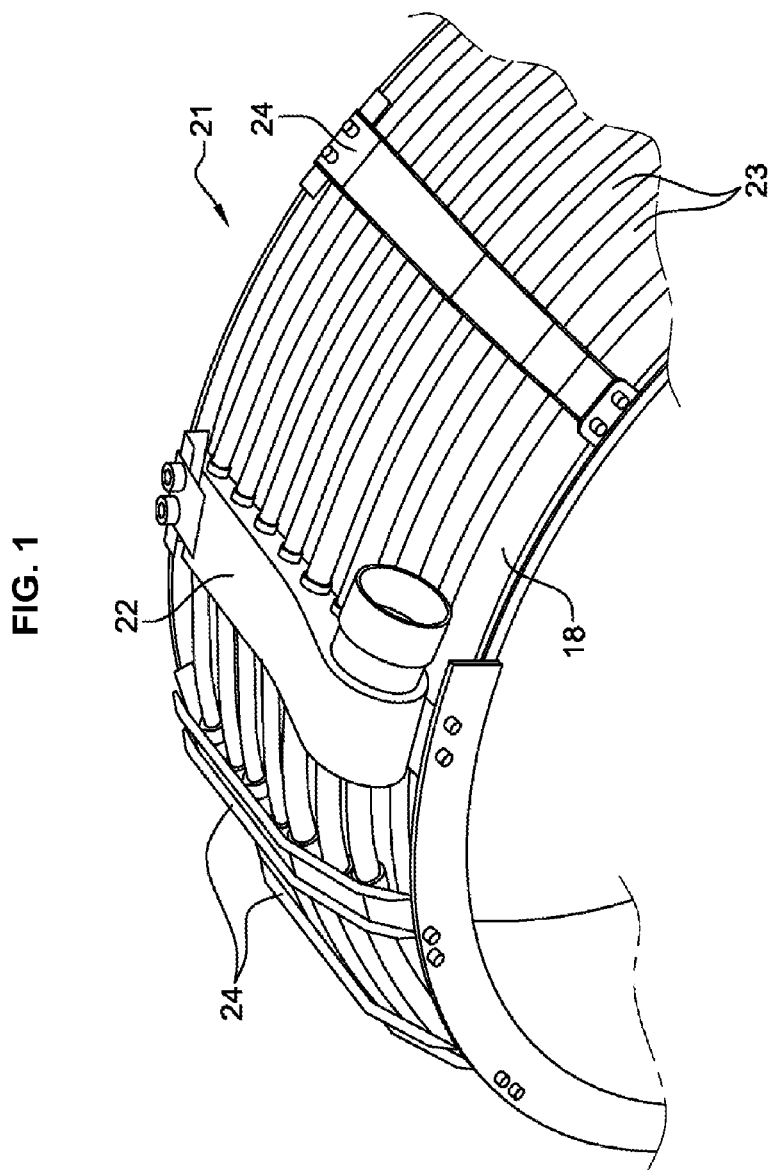
FIG. 1 described previously is a perspective view of a cooling device of the prior art.
Figure 2:
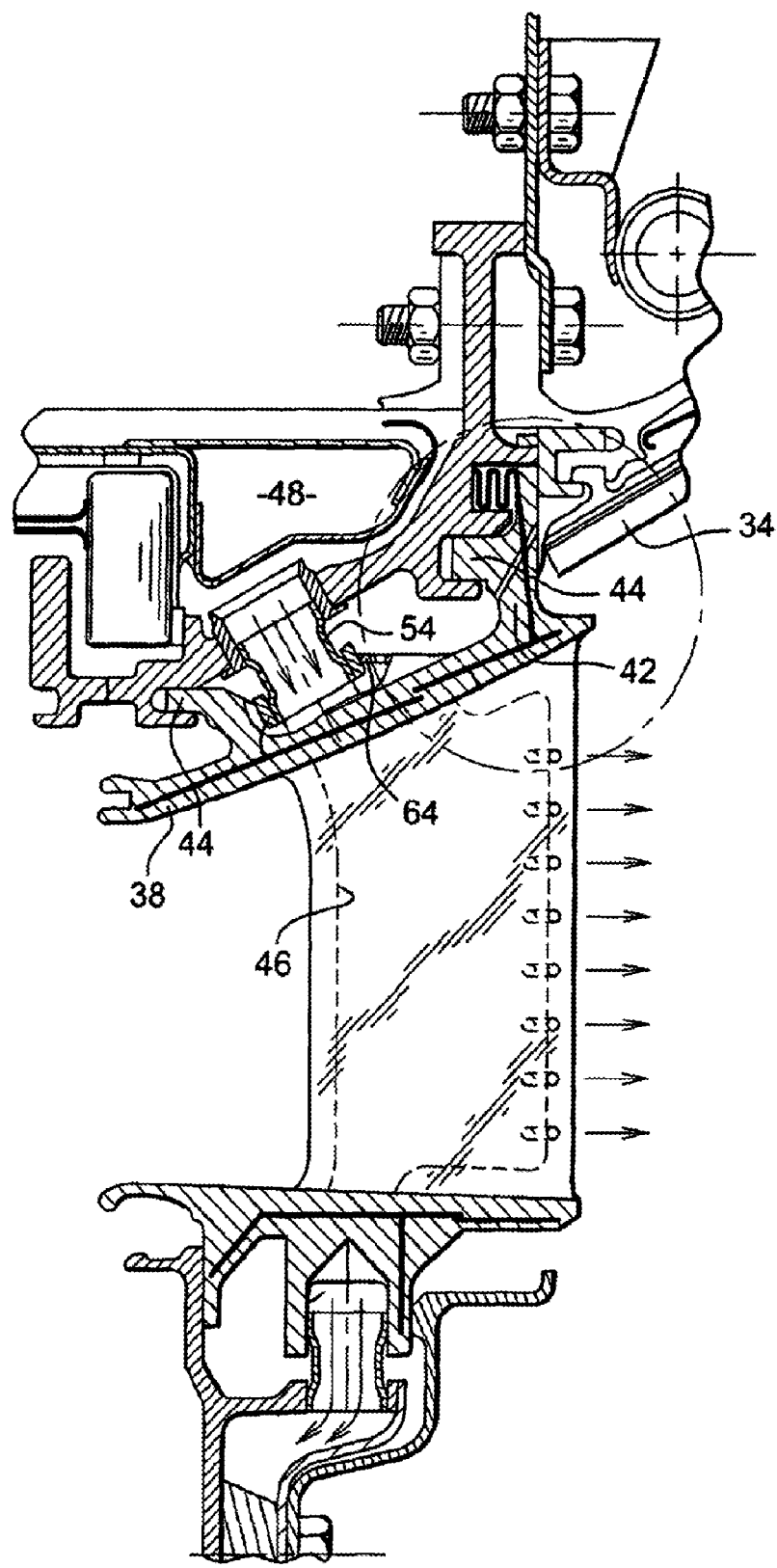
FIG. 2 described previously is a section view of a cooling device of the prior art.
Figure 2B:
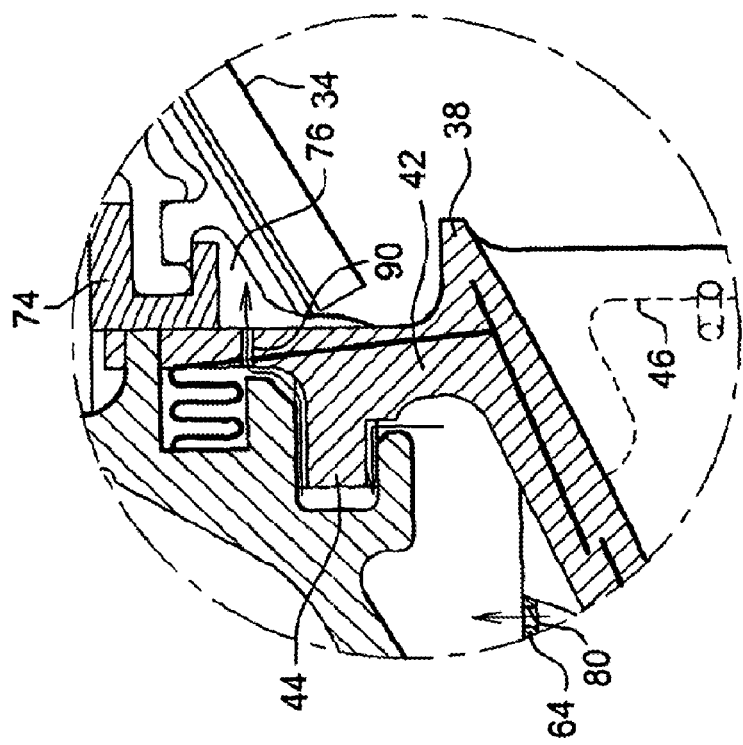
FIG. 2b described previously is a magnified section view of another cooling device of the prior art.
Figure 2A:
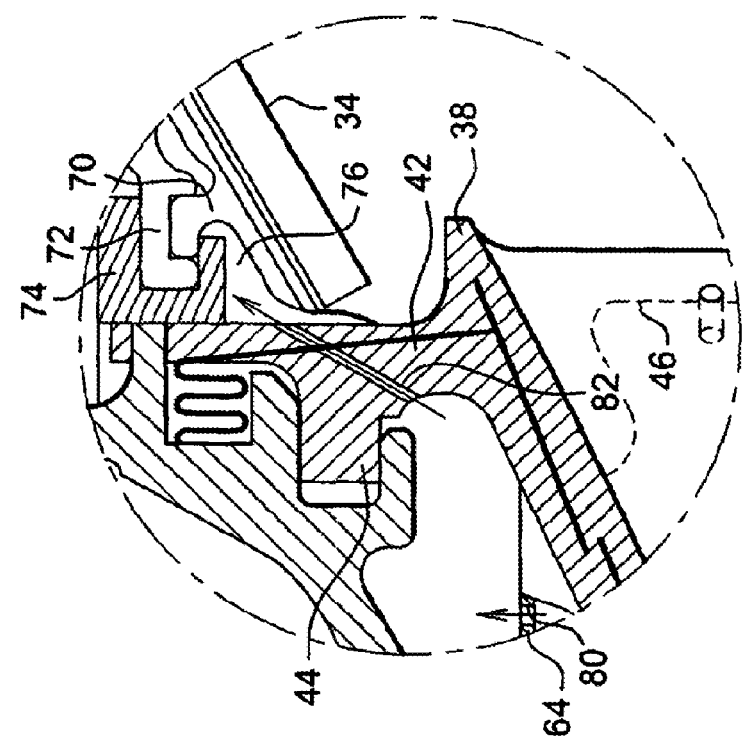
FIG. 2a described previously is a magnified section view of the device of FIG. 2.
Figure 3:
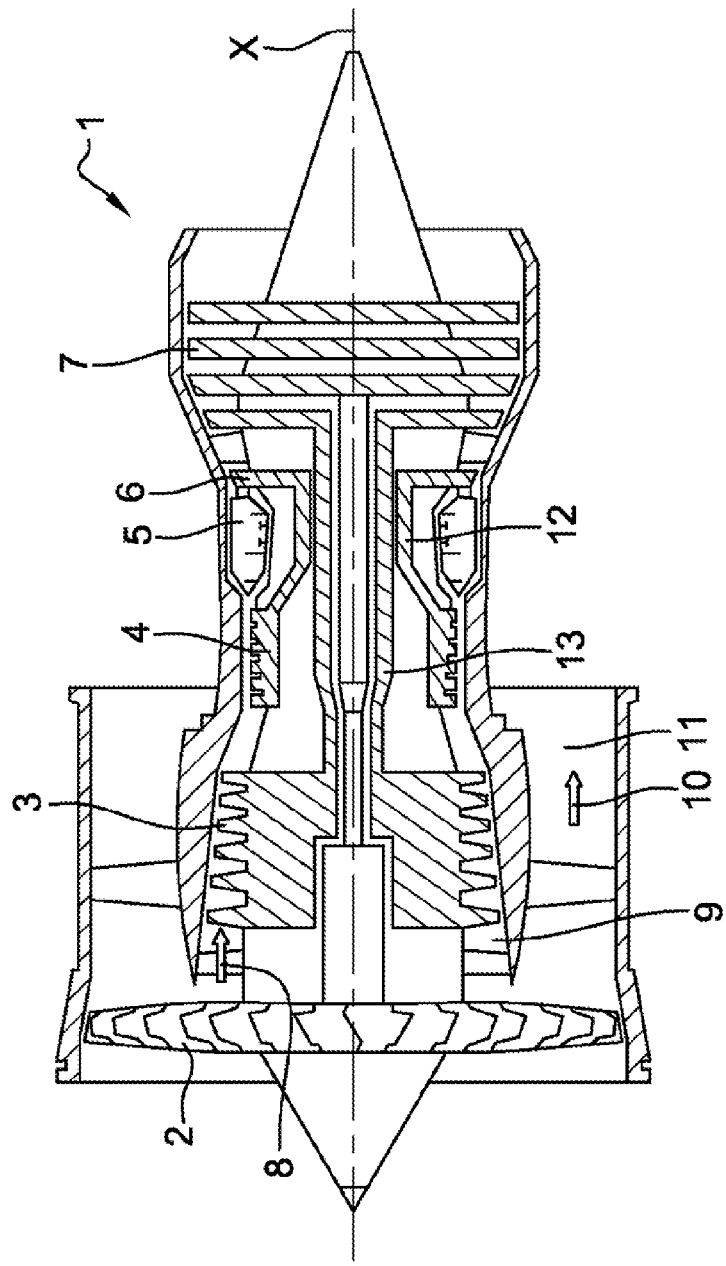
FIG. 3 is an axial section view of a bypass turbojet engine of the prior art.

FIG. 3 shows a twin spool bypass turbomachine 1. The axis of the turbomachine bears the reference X and corresponds to the axis of rotation of the rotating parts. In the following text, the terms axial and radial are defined with respect to the axis X.

The turbomachine 1 includes, from upstream to downstream in the direction of flow of the gas, a fan 2, a low-pressure compressor 3, a high-pressure compressor 4, a combustion chamber 5, a high-pressure turbine 6 and a low-pressure turbine 7.

The air coming from the fan 2 is divided into a primary flow 8 flowing in a primary annular flow path 9, and a secondary flow 10 flowing through a secondary annular flow path 11 surrounding the first annular flow path 9. The low-pressure compressor 3, the high-pressure compressor 4, the combustion chamber 5, the high-pressure turbine 6 and the low-pressure turbine 7 are fashioned in the primary flow path 9.

The rotor of the high-pressure turbine 6 and the rotor of the high-pressure compressor 4 are rotationally coupled by way of a first shaft 12 in such a way as to form a high-pressure spool.

The rotor of the low-pressure turbine 7 and the rotor of the low-pressure compressor 3 are rotationally coupled by way of a second shaft 13, in such a way as to form a low-pressure spool, the fan 2 being able to be connected directly to the rotor of the low-pressure compressor 3 or by way of an epicyclic gear train for example.

Figure 4:
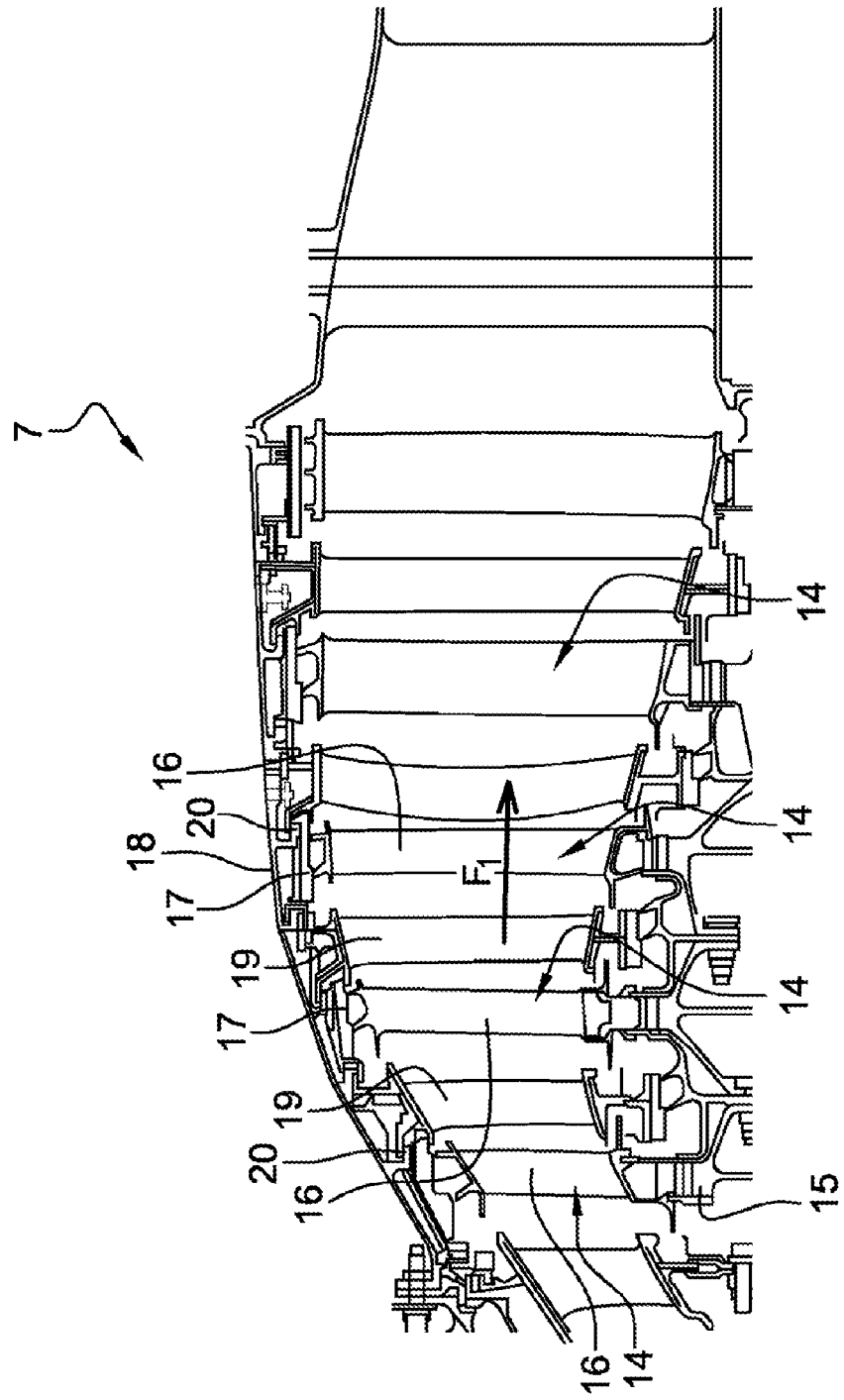
FIG. 4 is an axial section view of a part of the turbojet engine of the prior art, in particular illustrating the low-pressure turbine.

As can be seen more clearly in FIG. 4, the low-pressure turbine 7 in particular includes different successive stages including wheels 14 and fixed parts. The wheel includes a disc 15, at the level of which vanes 16 are mounted. The ends of the vanes 16 are surrounded by a fixed ring 17 made of abradable material, said ring 17 being attached to the casing 18 of the turbine. Nozzle guide vanes 19 are located upstream of the wheels 14. The nozzle guide vanes 19 and the rings 17 are mounted on the casing by way of flanges or hooks 20 extending from the radially inner surface of the casing 18. This casing 18 mainly supports the ring segments which surround each wheel 14 and the nozzle guide vane 19, using circumferential hooks 20 attached to the casing.

Figure 5:
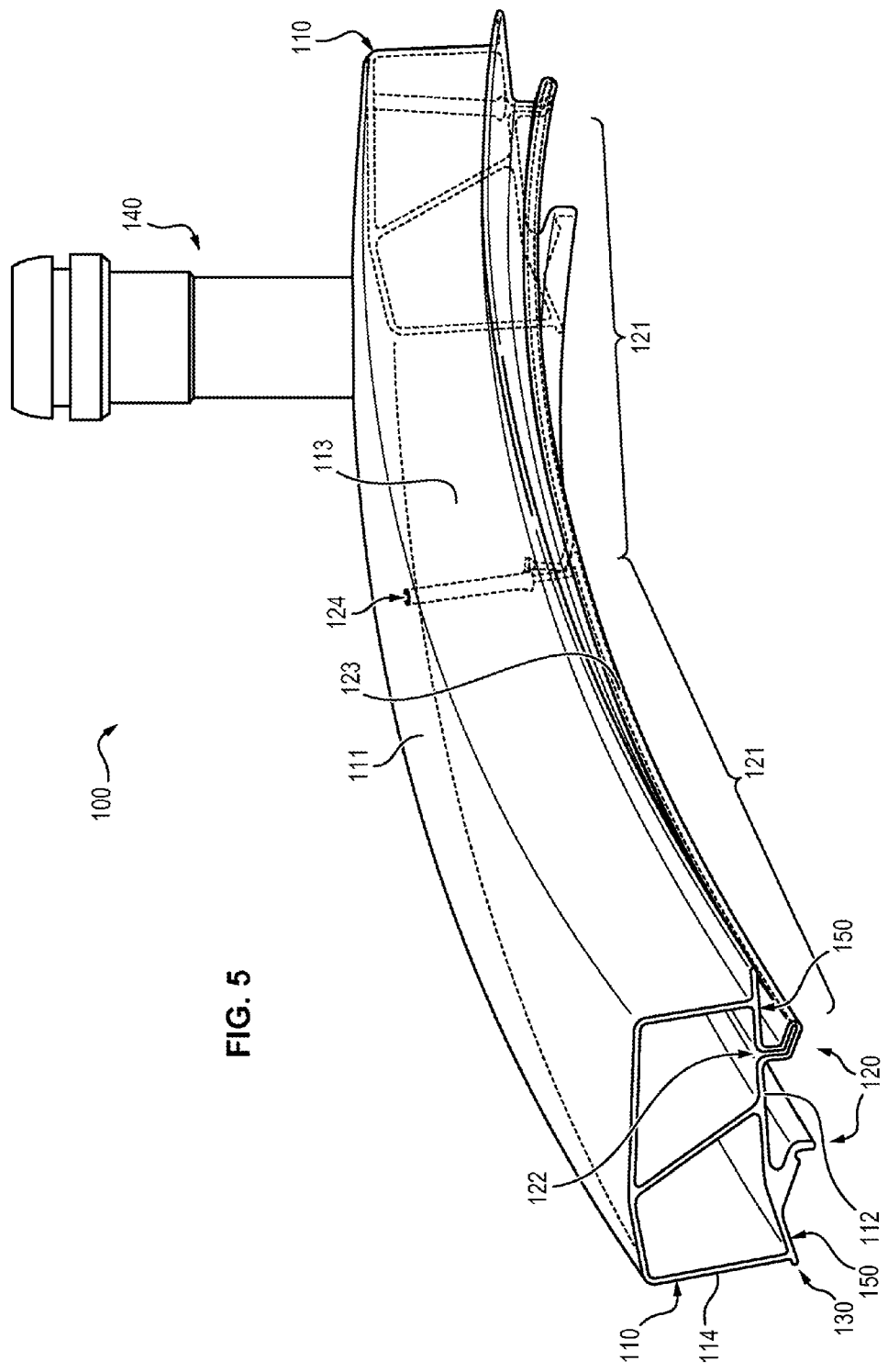
FIG. 5 is a perspective view of a turbomachine casing cooling device according to an embodiment of the invention.
Figure 6:
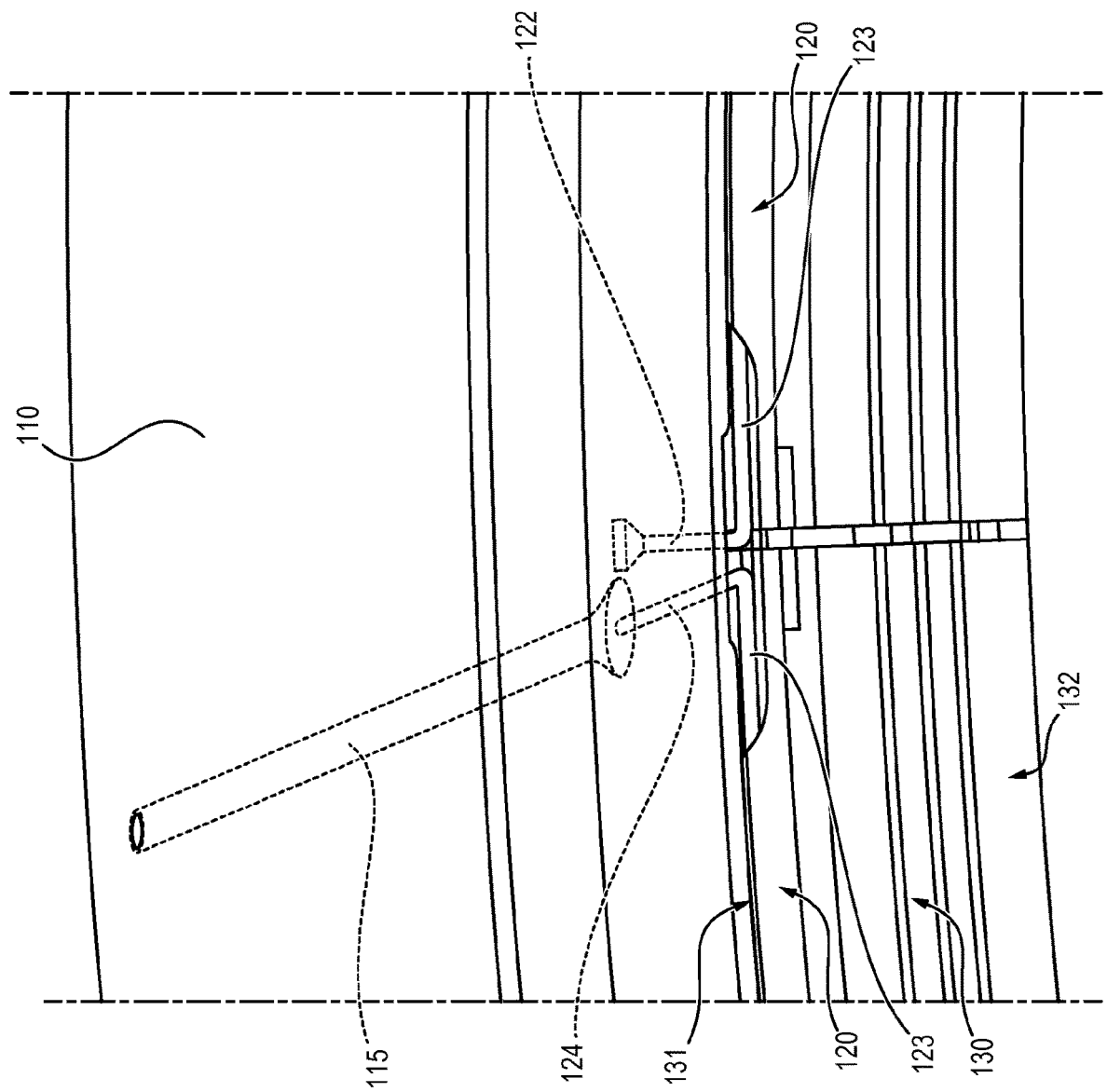
FIG. 6 is a detail view of the turbomachine casing cooling device of FIG. 5.

With reference to FIGS. 5 and 6, the illustration shows a cooling device 100 of a turbine casing 130, such as a low-pressure turbine for a turbomachine 1, according to an embodiment of the invention.

This cooling device 100 is incorporated into the casing 130.

The casing 130 extends around the longitudinal axis X of the turbomachine, which is also that of the turbine.

The casing 130 comprises, over a radial wall, an outer surface 131 and an inner surface 132.

The casing 130 further comprises a plurality of hooks 120 radially protruding inward with respect to its inner surface 132, the hooks 120 allowing, as previously described, the attachment of vanes of stator blading (nozzle guide vane) of the low-pressure turbine and sealing ring segments comprising an abradable element which is intended to be arranged radially facing the blades of the rotor.

Advantageously, the hooks 120 extend continuously over the circumference of the inner surface 132 in such a way as to form an annular manifold, in several positions axially offset from the casing 130.

It is necessary to protect the casing 130 from excessive heating to preserve the integrity of the elements of the casing 130 but also for another role, which is that of the control of the radial clearance between the blades of the turbine and the casing 130 surrounding it.

Specifically, the changes in the temperature of the casing 130 cause a variation in the clearance between the blades and the casing because of the thermal expansion of the casing 130.

The reduction of the clearance between the tips of the blades and the casing 130 is a determining element for the performance of the turbomachine since the lower the radial clearances, the lower the flow rate bypassing the blades and the better the efficiency of the turbine.

Controlling the clearances thus avoids the turbine losing performance. In the engine, it is of prime importance to control the clearances between the blade tips and a peripheral envelope. The radial displacement of this annular envelope being dependent on the expansion of the casing 130, the control of the temperature of at least a part of this casing 130 with fresh air is therefore essential.

As these hooks 120 are the portions of the casing 130 which directly determine the clearances at the blade ends, it is useful for the cooling device 100 to make provision for means for cooling these hooks 120.

With this aim, the device 100 includes a plurality of collector ducts 110 extending circumferentially all around the casing 130 substantially over the entire periphery, i.e. substantially at 360°. In the exemplary embodiment shown in FIGS. 5 and 6, these collector ducts 110 are two in number.

Each collector duct 110 surrounds the casing on respective circumference parts of the casing 130. As indicated the hooks 120 are disposed on the circumference of the inner surface 132 of the casing 130, over several axially separate stages. Advantageously, each collector 110 is disposed in such a way as to extend over a circumferential segment including a stage of hooks 120.

Typically for a low-pressure turbine, the cooling device 100 includes a plurality of collector ducts 110 disposed on as many stages of hooks 120 of the casing 130.

Each collector duct 110 is connected to a supply duct 140. Said supply duct 140 is mainly radial and opens onto the outer surface of the cooling device 100. The supply duct 140 is configured to draw off cool air from a bleed point, it is usually from a point of the secondary flow path of the gas of the machine, of which a part of the flow is drawn off, in a manner known to the prior art. Each collector duct 110 is thus connected to a pressurized air supply source for conveying air into said duct 110.

In the illustrated embodiment, a collector duct 110 includes an outer wall 111 (radially outer) and an inner wall 112 (radially inner), and two side walls 113 disposed on either side of the outer 111 and inner walls 112. Two axially adjacent collector ducts 110 can be separated by a separating wall consisting of one of the side walls 113 common to the two adjacent collector ducts 110.

The outer wall 111 includes a hole for connecting the collector duct 110 to the supply duct 140. Provision could be made for the connection to the pressurized air supply source on any wall of the collector 110 except for the inner wall 112.

The outer 111 and inner 112 walls are concentric, the collector duct 110 being able to have a trapezoidal cross section.

Advantageously, the inner wall 112 is configured to fit the shape of a circumferential segment of the casing 130, such that the inner wall 112 constitutes a part of the outer surface (skin) of the casing 130. In other words, each collector duct 110 and the wall 112 equipped with at least one hook 120 have a common portion 150, as can be seen in FIG. 5. This configuration makes it possible to cool a greater part of the outer surface of said casing 130 than that which can be cooled with the devices of the prior art and thus to increase the lifetime of the casing 130.

Advantageously, the collector duct 110 is made of a single part and can be obtained by an additive manufacturing process, such as laser melting.

As illustrated in more detail on FIG. 6, unlike the prior art, at least one hook 120 is not of solid section but includes at least one ventilation circuit 121 including an inlet channel 122, an outlet channel 124, and an inner longitudinal channel 123 extending over the circumferential length of the hook 120 between the inlet channel 122 and the outlet channel 124.

The inlet channel 122 is used to connect the longitudinal channel 123 with the inside of the collector duct 110. Preferably, the inlet channel 122 is plumb with the hook 120.

The outlet channel 124 makes it possible to connect the longitudinal channel 123 with the outside of the casing 130 and of the collector duct 110, by a passage 115 passing through the collector duct 110 and opening onto the surface of the outer wall 111. Preferably, the outlet channel 124 is plumb with the hook 120.

Advantageously, the outlet channel 124 is used to connect the longitudinal channel 123 to a point of the turbomachine 1, where the pressure is lower than the pressure of the bleed point. Preferably, the discharge point is in the core.

As described previously, the hooks 120 are configured to support ring segments. Preferably, the hooks 120 comprise one inlet channel 122 and one outlet channel 124 per ring segment. The inlet channel 122 and the outlet channel 124 being advantageously disposed at a first and a second circumferential position of the hook 120 corresponding to the circumferentially opposite ends of a ring segment positioned in the hook 120. Thus, the circumferential length of the longitudinal channel 123 is equivalent to approximately the circumferential length of one ring segment.

Typically for a low-pressure turbine, a casing 130 hook 120 is configured to support 20 to 30 ring segments. Thus for one circumferential segment of the casing 130 including one stage of hooks 120, the cooling device 100 will include a corresponding number of ventilation circuits 121, i.e. 20 to 30 following one another circumferentially.

Preferably, within one and the same hook 120, for two successive ventilation circuits 121, the outlet channel 124 of a first ventilation circuit 121 is joined to the inlet channel 122 of a second ventilation circuit 121.

Advantageously, unlike the prior art in which the hooks are cooled by impingement jet devices, the cooling device 100 makes it possible to use a pressurized air source and to make it circulate inside the casing 130 hooks 120 in such a way as to increase the cooling capacity by pumping cooling air.

In addition, the circulation of air over sections extending circumferentially makes it possible to better cool the hook ends and to reduce angular thermal distortion.

The cooling device 100 therefore allows a better cooling of the casing 130 hook 120 over its whole length, an increase in the lifetime of the hook by limiting the thermal gradients over the length of the hook 120, and by limiting the tangential thermal gradients.

Furthermore, the system of collector ducts 110 of the casing 130 makes it possible to homogenize the cooling inlet temperature of the casing 130.

In addition, by comparison with the prior art, the cooling device 100 makes it possible to draw off less bleed flow to perform the same function of thermal protection of the casing.

Also, the cooling device 100 can be easily incorporated into models of engines comprising a casing with hooks.

Naturally the invention is not limited to the embodiments described with reference to the figures and variants could be envisioned without departing from the scope of the invention. The collector duct could have thus other geometries.

The invention claimed is:

1. A turbomachine turbine casing, said turbomachine turbine casing extending around an axis, the turbomachine turbine casing comprising an annular wall and a cooling device, the annular wall being provided with at least one casing hook which extends in radial protrusion from an inside of the annular wall, each casing hook being configured to allow a mounting, on the turbomachine turbine casing, of ring segments disposed circumferentially end to end around the axis, and the cooling device comprising at least one collector duct which is intended to convey cooling air and which extends circumferentially around the annular wall, each of the at least one collector duct having a cooling air inlet and a cooling air outlet, wherein each of the at least one collector duct and the annular wall have a common portion, which delimits the collector duct and from which the corresponding casing hook extends.

2. The turbomachine turbine casing as claimed in claim 1, wherein the cooling device comprises two axially adjacent collector ducts, separated by a separating wall.

3. The turbomachine turbine casing as claimed in claim 1, wherein each collector duct is in fluid communication with a ventilation circuit which extends in the corresponding casing hook.

4. The turbomachine turbine casing as claimed in claim 3, wherein each ventilation circuit extends in a greater axial part of an axial extent of the corresponding casing hook.

5. The turbomachine turbine casing as claimed in claim 3, wherein each ventilation circuit extends circumferentially in the corresponding casing hook.

6. The turbomachine turbine casing as claimed in claim 5, wherein the inlet of each collector duct is connected to a supply tube for conveying air into the collector duct.

7. The turbomachine turbine casing as claimed in claim 3, wherein each ventilation circuit opens mainly radially into the corresponding collector duct via an inlet channel.

8. The turbomachine turbine casing as claimed in claim 7, wherein the inlet channel extends plumb with the corresponding casing hook.

9. The turbomachine turbine casing as claimed in claim 3, wherein each ventilation circuit opens onto an outer surface of the cooling device via an outlet channel.

10. The turbomachine turbine casing as claimed in claim 9, wherein the outlet channel extends plumb with the corresponding casing hook.

11. The turbomachine turbine casing as claimed in claim 3, wherein each ventilation circuit opens mainly radially into the corresponding collector duct via an inlet channel, wherein each ventilation circuit opens onto an outer surface of the cooling device via an outlet channel and wherein the inlet channel and the outlet channel extend at a first circumferential position and at a second circumferential position of the corresponding casing hook, the first circumferential position and the second circumferential position of said corresponding casing hook being intended to coincide with circumferentially opposite ends of a ring segment intended to be mounted on the corresponding casing hook.

12. A turbomachine including a turbine, wherein the turbomachine comprises a turbomachine turbine casing as claimed in claim 1.

* * * * *